US011845332B2

(12) United States Patent
Yajima et al.

(10) Patent No.: US 11,845,332 B2
(45) Date of Patent: Dec. 19, 2023

(54) VALVE DEVICE

(71) Applicant: PIOLAX, INC., Kanagawa (JP)

(72) Inventors: Kazuki Yajima, Kanagawa (JP); Kenta Mihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 18/083,049

(22) Filed: Dec. 16, 2022

(65) Prior Publication Data

US 2023/0191903 A1 Jun. 22, 2023

(30) Foreign Application Priority Data

Dec. 21, 2021 (JP) .................................. 2021-207586

(51) Int. Cl.
*B60K 15/035* (2006.01)
*F16K 24/04* (2006.01)
*B60K 15/03* (2006.01)
*F16K 1/36* (2006.01)

(52) U.S. Cl.
CPC .......... *B60K 15/03504* (2013.01); *F16K 1/36* (2013.01); *F16K 24/044* (2013.01); *B60K 2015/03289* (2013.01); *B60K 2015/03557* (2013.01)

(58) Field of Classification Search
CPC .... B60K 15/03519; B60K 2015/03289; F16K 24/042; F16K 24/044; F16K 31/20; F16K 31/22; F02M 37/00
See application file for complete search history.

(56) References Cited

U.S. PATENT DOCUMENTS

| 2017/0175912 A1 | 6/2017 | Wada |
| 2021/0107352 A1 | 4/2021 | Okabayashi |
| 2021/0157339 A1 | 5/2021 | Mihara |

FOREIGN PATENT DOCUMENTS

| JP | 6898516 B2 | 7/2021 |
| WO | WO 2020/105541 A1 | 5/2020 |
| WO | WO 2022/064745 A1 | 3/2022 |

OTHER PUBLICATIONS

Jul. 13, 2023, British Search Report issued for related GB Patent Application No. GB2219072.2.

*Primary Examiner* — Hailey K. Do

(74) *Attorney, Agent, or Firm* — Paratus Law Group, PLLC

(57) ABSTRACT

There is provided a valve device, including: a housing; a float valve; and a seal member. An opening portion includes a first region, and a second region. The seal member includes a first cover portion, and a second cover portion. The second cover portion includes a support portion, a wide portion, and a narrow portion. In a state where the seal member is retained and supported by the support portion with respect to the float valve, a width of the wide portion is set such that a tip end of the second region is covered, and that the second region of the opening portion is not exposed out of the seal member even in a state where the seal member is maximally displaced in a radial direction and; or a peripheral direction of the housing with respect to the opening portion.

4 Claims, 12 Drawing Sheets

VALVE DEVICE

CROSS-REFERENCE TO RELATED APPLICATIONS

This application is based on Japanese Patent Application No. 2021-207586 filed on Dec. 21, 2021, the contents of which are incorporated herein by way of reference.

TECHNICAL FIELD

The present invention relates to a valve device that is to be attached to a fuel tank of an automobile or the like and is used as a fuel outflow suppression valve, a filling-up restriction valve, or the like.

BACKGROUND

For example, a fuel tank of a vehicle such as an automobile is provided with a valve device for suppressing a fuel in the fuel tank from leaking out of the fuel tank when the vehicle is tilted or overturned. Such a valve device generally includes a housing provided with a ventilation chamber on an upper side and a valve chamber on a lower side via a partition wall having a ventilation hole, and a float valve disposed in the valve chamber so as to be raised and lowered. A seal member made of rubber or the like may be disposed on an upper side of the float valve for a purpose of improving a sealing property with respect to the ventilation hole.

For example, Patent Literature 1 listed below describes a valve device including a housing in which a valve chamber on a lower side and a ventilation chamber on an upper side are provided via a partition wall, and a ventilation hole for communicating is provided in the partition wall, and a float valve accommodated in the valve chamber so as to be raised and lowered. A valve seat is formed on a valve chamber side of the partition wall, and an opening portion is provided in an inner side of the valve seat. The opening portion includes a first opening, and a second opening extending in a slit shape from at least one position of the first opening, and a seal portion having elasticity for opening and closing the first opening and the second opening is disposed on an upper side of the float valve.

Patent Literature 1: JP6898516B

When a vehicle is overturned, a float valve slides to close an opening portion in order to suppress a fuel from flowing into a ventilation chamber from the opening portion, but when the vehicle is overturned, a fuel tank and a valve device themselves are also overturned accordingly. Thus, the float valve is shifted to one side with respect to a valve chamber of a housing.

In a case of the valve device of Patent Literature 1, even if the float valve slides in a direction approaching the opening portion in the above state, a situation may occur in which the seal portion on the upper side of the float valve does not come into contact with the opening portion of the housing at a predetermined position, but rather comes into contact with the opening portion in a displaced manner, and the opening portion may not be reliably closed.

Therefore, an object of the present invention is to provide a valve device capable of reliably closing an opening portion even when a vehicle is overturned.

SUMMARY

There is provided a valve device, including: a housing in which a valve chamber configured to communicate with an inside of a fuel tank on a lower side and a ventilation chamber configured to communicate with an outside of the fuel tank on an upper side are provided via a partition wall, and an opening portion through which the valve chamber and the ventilation chamber are to communicate with each other is formed in the partition wall; a float valve slidably accommodated in the valve chamber; and a seal member disposed on an upper side of the float valve and configured to close the opening portion. The opening portion includes a first region, and a second region extending in a slit shape from the first region and forming an end portion of the opening portion. The seal member includes a first cover portion covering the first region, and a second cover portion extending from the first cover portion so as to cover the second region. The second cover portion includes a support portion disposed on a tip end side in an extending direction of the second cover portion and configured to retain and support the seal member with respect to the float valve, a wide portion disposed on a base end side in the extending direction with respect to the support portion, and a narrow portion provided on a base end side in the extending direction with respect to the wide portion and formed to be narrower than the wide portion. In a state where the seal member is retained and supported by the support portion with respect to the float valve, a width of the wide portion is set such that a tip end of the second region is covered, and that the second region of the opening portion is not exposed out of the seal member even in a state where the seal member is maximally displaced in a radial direction and/or a peripheral direction of the housing with respect to the opening portion.

DESCRIPTION OF EMBODIMENTS

Embodiment of Valve Device

Hereinafter, an embodiment of a valve device according to the present invention will be described with reference to the drawings. In the following description, the term "fuel" means a liquid fuel (including fuel droplets), and the term "fuel vapor" means an evaporated fuel.

Figure 1:
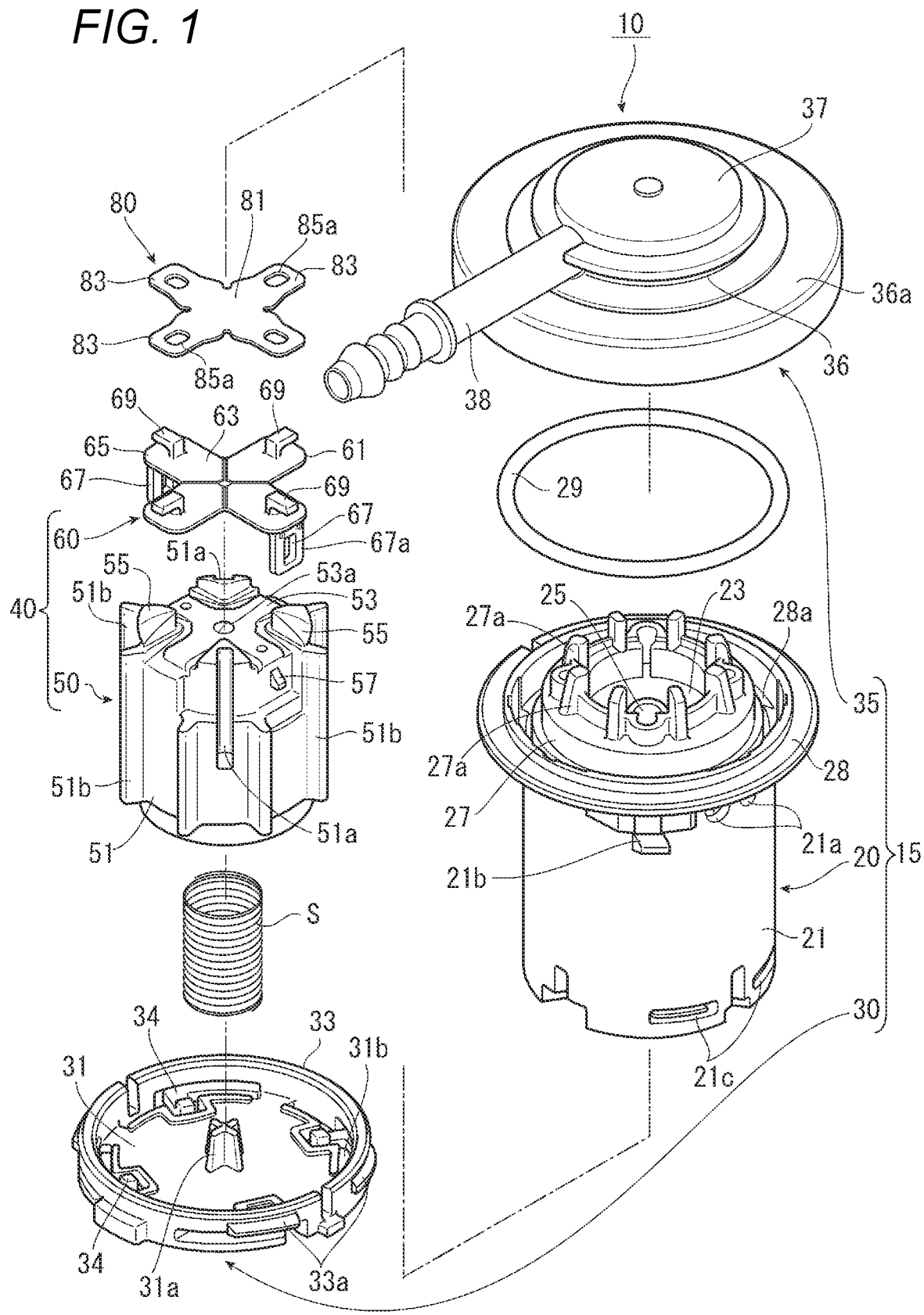
FIG. 1 is an exploded perspective view showing an embodiment of a valve device according to the present invention.
Figure 2:
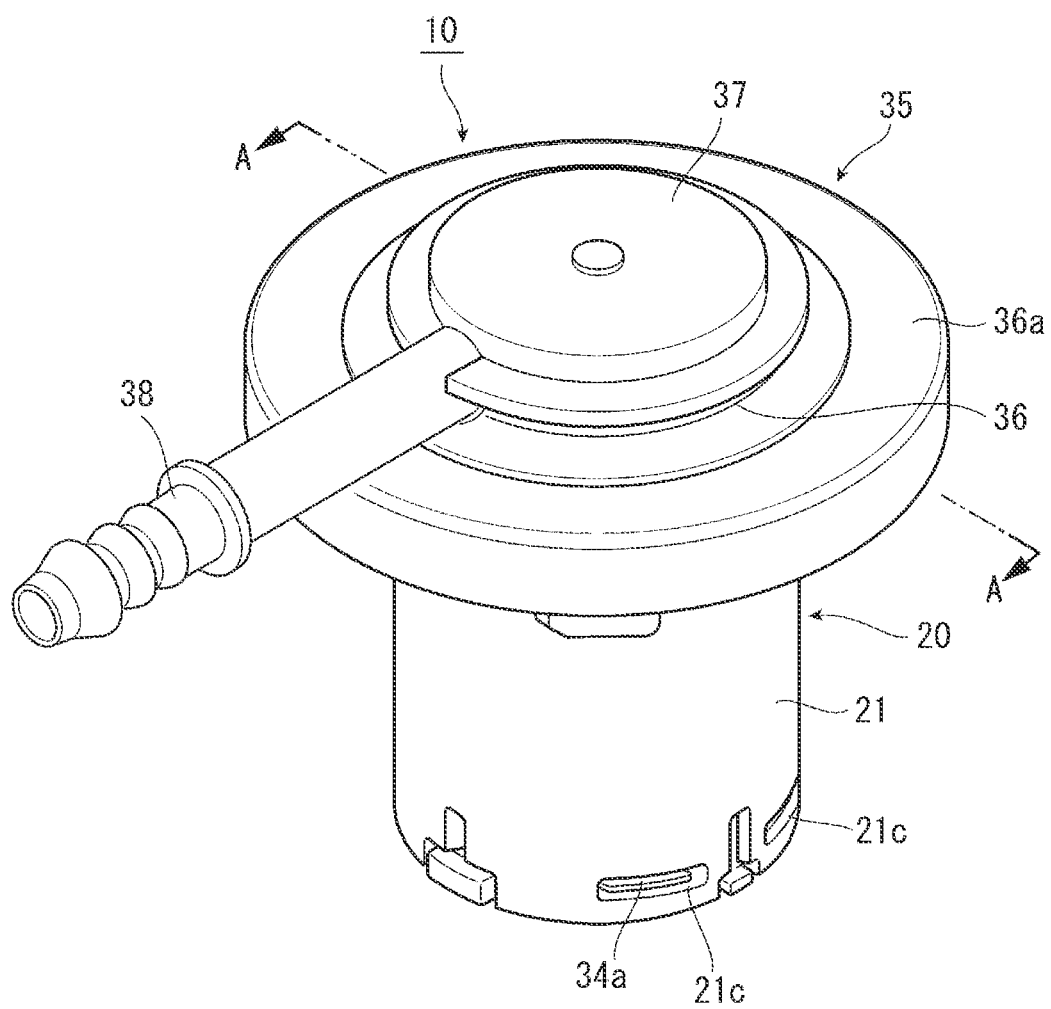
FIG. 2 is a perspective view of the valve device.
Figure 3:
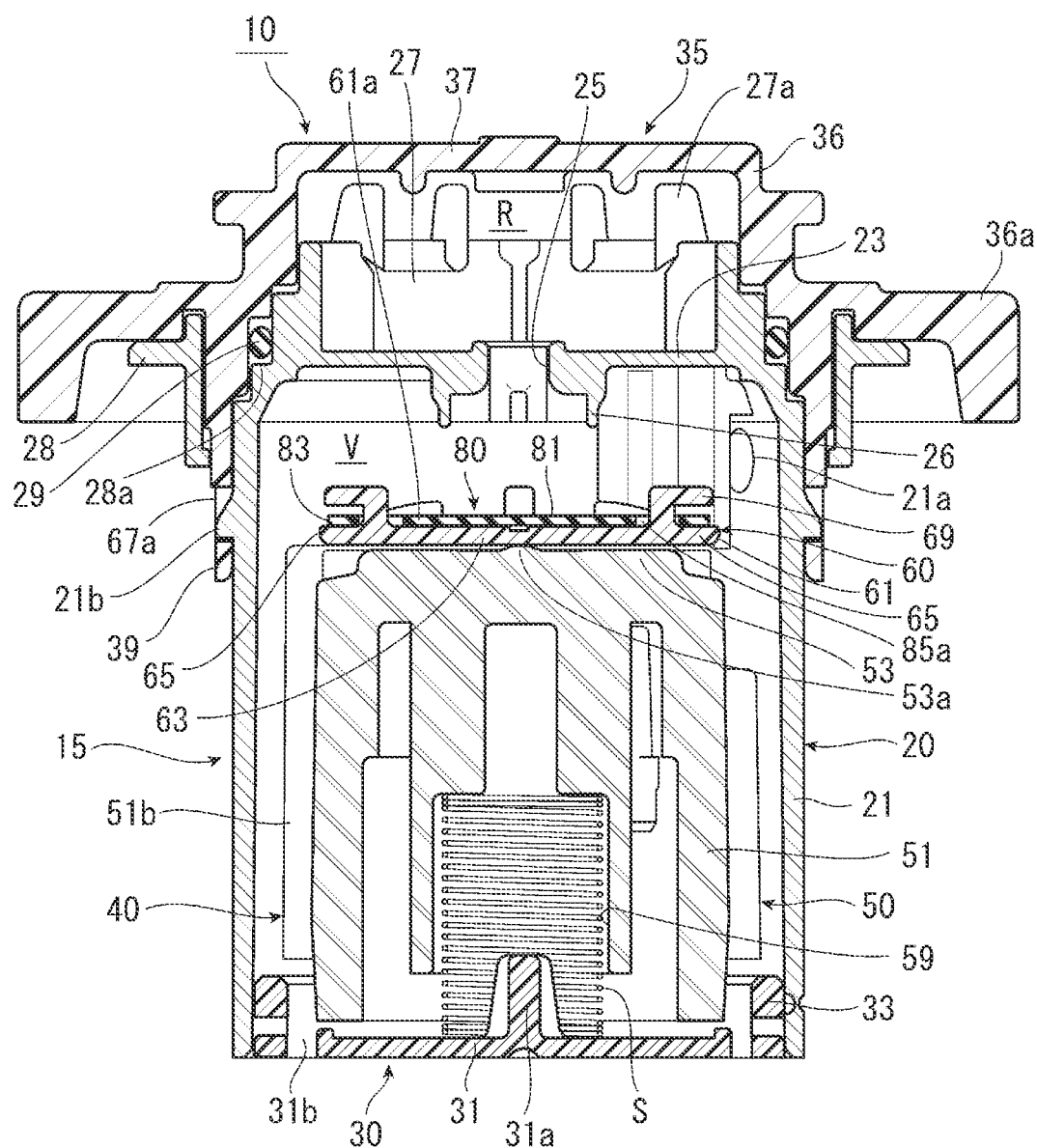
FIG. 3 is a cross-sectional view taken along a line A-A in FIG. 2.

As shown in FIGS. 1 and 3, a valve device 10 in the embodiment includes a housing in which a valve chamber V communicating with an inside of a fuel tank on a lower side and a ventilation chamber R communicating with an outside of the fuel tank on an upper side are provided via a partition wall 23, and an opening portion 25 through which the valve chamber V and the ventilation chamber R communicate with each other is formed in the partition wall 23, a float valve 40 slidably accommodated in the valve chamber V, a seal member 80 disposed on an upper side of the float valve 40 and configured to close the opening portion 25, and an urging spring S urging the float valve 40.

The housing 15 in the embodiment has a substantially cylindrical shape, and includes a housing main body 20 provided with the partition INA 23 on an upper side, a lower cap 30 mounted on a lower side of the housing main body 20, and an upper cover 35 mounted on an upper side of the housing main body 20.

The housing main body 20 includes a peripheral wall 21 having a substantially cylindrical shape, and the partition wall 23 is disposed on an upper side of the peripheral wall 21. A plurality of through holes 21a and locking protrusions 21b are formed on the upper side of the peripheral wall 21, and locking holes 21c are formed on a lower side of the peripheral wall 21. The opening portion 25 is formed in a central portion of the partition wall 23. Further, a cylindrical wall 27 protrudes from an upper surface side of the partition wall 23 and an outside of the opening portion 25. A plurality of ribs 27a protrude from an upper outer periphery of the cylindrical wall 27. A flange portion 28 protrudes from an upper outer periphery of the peripheral wall 21. Further, a ring mounting groove 28a is formed between the flange portion 28 and the cylindrical wall 27, and an annular seal ring 29 is mounted in the ring mounting groove 28a (see FIG. 3).

Figure 7:
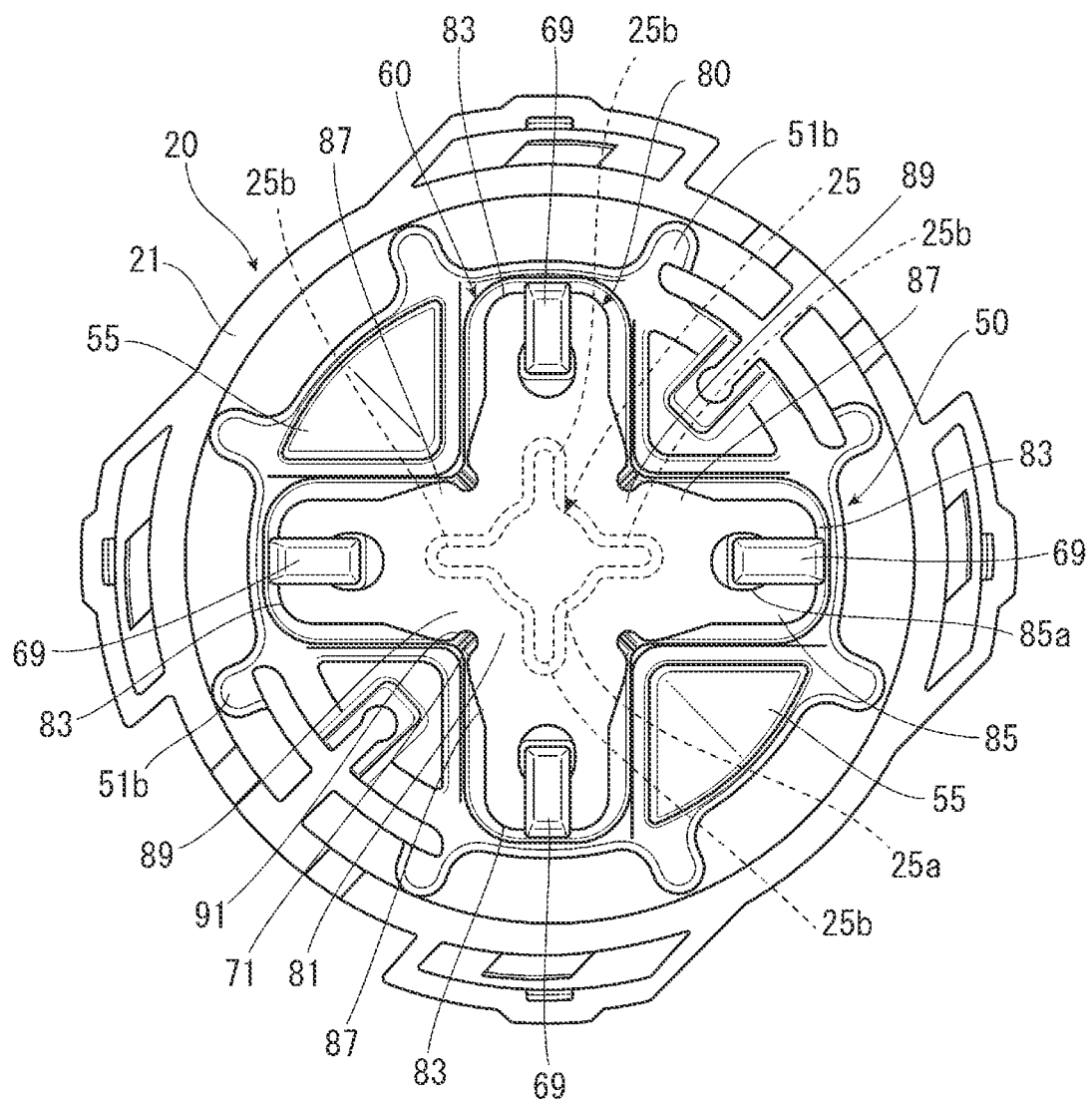
FIG. 7 is a plan view showing a housing main body constituting a housing, the float valve, the seal support member, and the seal member in the valve device.

As shown in FIG. 7, the opening portion 25 has a first region 25a, and second regions 25b each extending in a slit shape from the first region 25a and forming an end portion of the opening portion 25. The opening portion 25 in the embodiment has the first region 25a having a substantially circular hole shape, and a plurality of (here, four) second regions 25b extending outward in a slit shape from an outer periphery of the first region 25 at equal intervals in a peripheral direction, and is a substantially cross-shaped opening having a diameter enlarged in a central portion. The second region 25b communicates with the first region 25a, and is narrower than a maximum inner dimension (here, an inner diameter) of the first region 25a.

As shown in FIG. 3, the opening portion 25 includes a valve seat 26 protruding downward from a peripheral edge of a rear side of the opening portion 25 (a valve chamber V side). The opening portion 25 is opened and closed when the seal member 80 is brought into contact with and separated from a lower end portion of the valve seat 26.

On the other hand, the lower cap 30 includes a bottom wall 31 having a substantially circular plate shape, and a peripheral wall 33 erected from a peripheral edge of the bottom wall 31. A spring support protrusion 31a that supports a lower end portion of the urging spring S protrudes from a central portion in a radial direction of the bottom wall 31. On the bottom wall 31, a plurality of through holes 31b are formed, and elastic pieces 34 for suppressing a hammering sound when the float valve 40 is lowered are formed to be deflectable and deformable. Further, a plurality of locking claws 33a are formed on the peripheral wall 33.

The lower cap 30 is mounted on the lower side of the housing main body 20 by locking the locking claws 33a of the lower cap 30 to the locking holes 21c of the housing main body 20, respectively. As a result, the valve chamber V communicating with the inside of the fuel tank (not shown) is formed in a lower side of the housing via the partition wall 23 (see FIG. 3).

As shown in FIG. 1, the upper cover 35 includes a peripheral wall 36 extending at a predetermined height, a ceiling wall 37 closing an upper portion of the peripheral wall 36, and a flange portion 36a annularly extending from the middle of an extending direction of the peripheral wall 36. A ventilation hole (not shown) is formed at a predetermined position of the peripheral wall 36, and a fuel vapor pipe 38 having a substantially cylindrical shape extends outward from an outer peripheral edge portion of the ventilation hole. A tube (not shown) communicating with a canister or the like disposed outside the fuel tank (not shown) is connected to the fuel vapor pipe 38. As shown in FIG. 3, frame-shaped locking pieces 39 which are locked to the respective locking protrusions 21b of the housing main body 20 are vertically provided from a lower end surface of the peripheral wall 36.

As shown in FIG. 3, by locking the locking pieces 39 of the upper cover 35 to the corresponding locking protrusions 21b of the housing main body 20, the upper cover 35 is mounted on the upper side of the housing main body 20 in a state where the seal ring 29 mounted in the ring mounting groove 28a is in contact with an inner periphery of the peripheral wall 36 of the upper cover 35, As a result, the ventilation chamber R communicating with the outside of the fuel tank is formed on the upper side via the partition wall 23 (see FIG. 3).

Next, the float valve 40 will be described in detail.

The float valve 40 in the embodiment includes a float main body 50, and a seal support member 60 that is disposed on an upper side of the float main body 50, is retained and held swingably with respect to the float main body 50, and retains and supports the seal member 80 so as to be movable by a predetermined distance.

The float main body 50 includes a peripheral wall 51 extending in an upper-lower direction with a predetermined length, and a ceiling wall 53 disposed on an upper side of the peripheral wall 51, and has a substantially cylindrical shape opened downward and closed upward.

A pair of guide grooves 51a and 51a extending in an axial direction from the ceiling wall 53 toward a lower side of the peripheral wall are formed at two positions facing each other in a peripheral direction of the peripheral wall 51. Guide ridges (not shown) provided on an inner periphery of the housing main body 20 are inserted into the guide grooves 51a and 51a respectively to guide a sliding operation of the float valve 40. Further, a plurality of guide ribs 51b radially provided on an outer periphery of the peripheral wall 51 extend along the axial direction. These guide ribs 51b are disposed to face an inner periphery of the peripheral wall 21 of the housing main body 20 to guide the sliding operation of the float valve 40.

A support protrusion 53a having a curved outer surface protrudes from a center of a surface (also referred to as an "upper surface". the same applies in the following description) of the ceiling wall 53. A plate-shaped portion 61 of the seal support member 60 is placed on the support protrusion 53a, and swingably supports the seal support member 60. Further, a plurality of (here, four) protrusions 55 protrude from an outer peripheral edge portion of the ceiling wall 53 at equal intervals in the peripheral direction.

Retaining protrusions 57 and 57 for swingably retaining and holding the seal support member 60 with respect to the float main body 50 protrude from an outer peripheral surface of an upper end portion of the peripheral wall 51 near the ceiling wall 53 and at two locations facing each other in a radial direction. The retaining protrusion 57 is inserted into a retaining hole 67a (to be described later) provided in the seal support member 60 so as to be slidable along an axial direction Z (see FIG. 4) of the float valve 40 and movable along a width direction Y (see FIG. 4) of the float valve 40.

The float main body 50 is formed with a spring accommodating recess 59 opened downward (see FIG. 3), and the urging spring S is accommodated in the spring accommodating recess 59. The float valve 40 is slidably accommodated in the valve chamber V in a state where the urging spring S is interposed between the float valve 40 and the lower cap 30, slides upward by its own buoyancy and an urging force of the urging spring S when immersed by a fuel, and slides downward by its own weight when not immersed by the fuel. Further, the float valve 40 is slidable by the urging force of the urging spring S even when a vehicle such as an automobile is overturned by 90°, whereby the seal member 80 can be brought into contact with the valve seat 26 to close the opening portion 25.

On the other hand, the seal support member 60 in the embodiment is disposed between the float main body 50 and the seal member 80, and includes the plate-shaped portion 61 formed with a predetermined thickness. The seal member 80 is placed and supported on a placement surface 61a of the plate-shaped portion 61 (see FIG. 3).

Figure 5A:
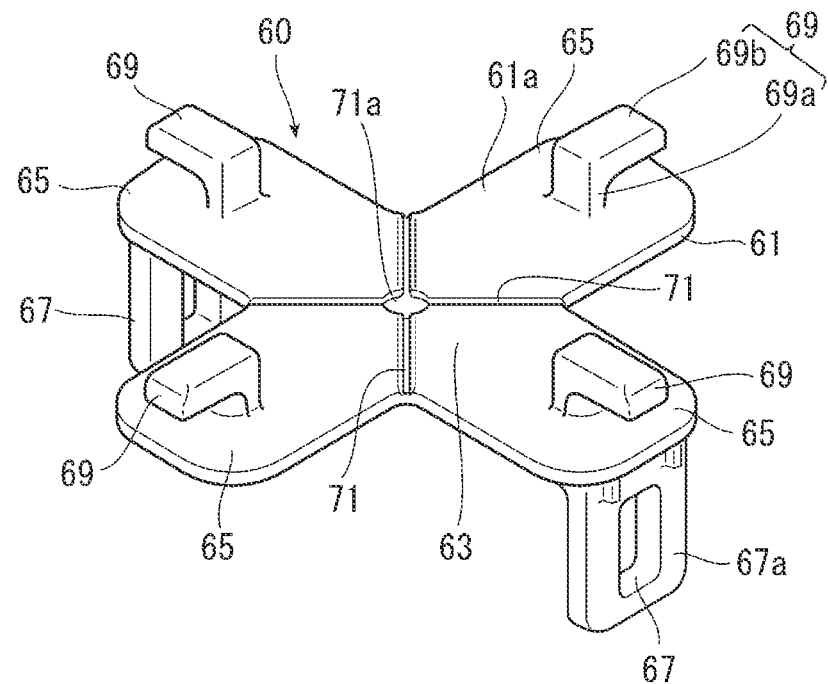
FIG. 5A is an enlarged perspective view of a seal support member constituting the float valve of the valve device.
Figure 5B:
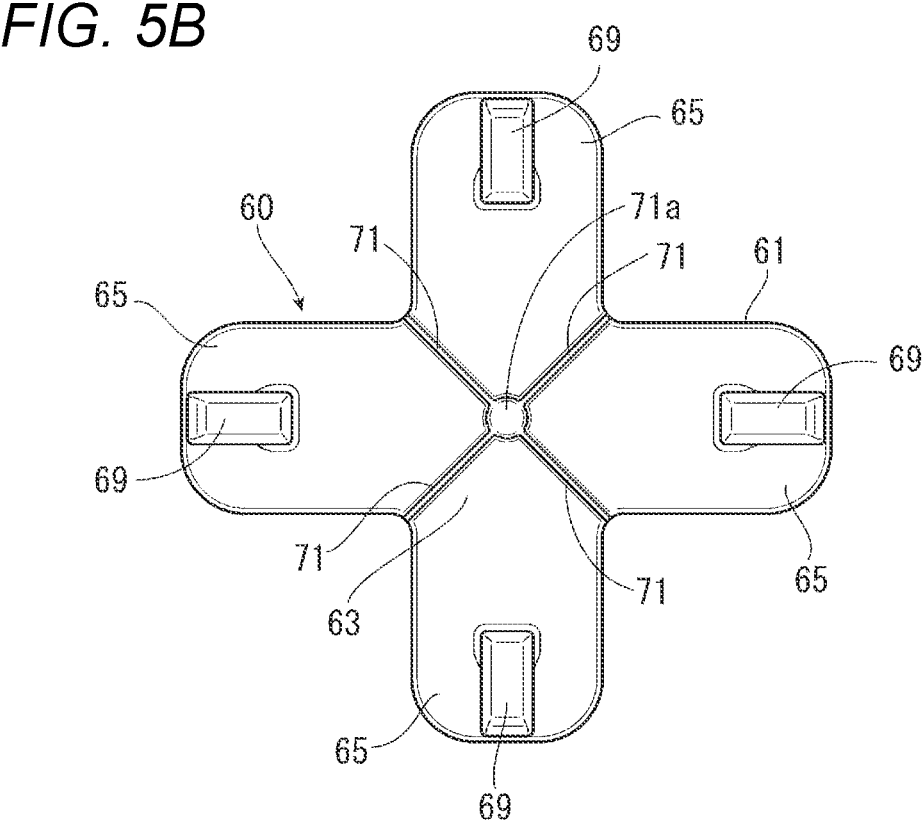
FIG. 5B is a plan view of the seal support member.

Referring also to FIGS. 5A and 5B, the plate-shaped portion 61 includes a central portion 63 and a plurality of extending portions 65 extending outward from the central portion 63. The plate-shaped portion 61 in the embodiment has a shape adapted to the seal member so as to receive and support the seal member 80 having a substantially cross shape as a whole. That is, in the plate-shaped portion 61, four extending portions 65 radially extend outward from the central portion 63, and the extending portions 65 and 65 adjacent to each other in a peripheral direction are orthogonal to each other, so that the plate-shaped portion 61 has a substantially cross shape as a whole.

Retaining pieces 67 and 67 are vertically provided from a pair of extending portions 65 and 65 disposed to face each other with the central portion 63 interposed therebetween and rear sides of tip end portions of the extending portions 65 and 65 (a float main body 50 side), respectively. The retaining piece 67 is formed with the retaining hole 67a having an elongated hole shape extending along the axial direction of the float valve 40. The retaining hole 67a has a substantially rectangular shape that is longer than an axial length of the retaining protrusion 57 provided on the float main body 50 side and wider than a peripheral width of the retaining protrusion 57.

Figure 4:
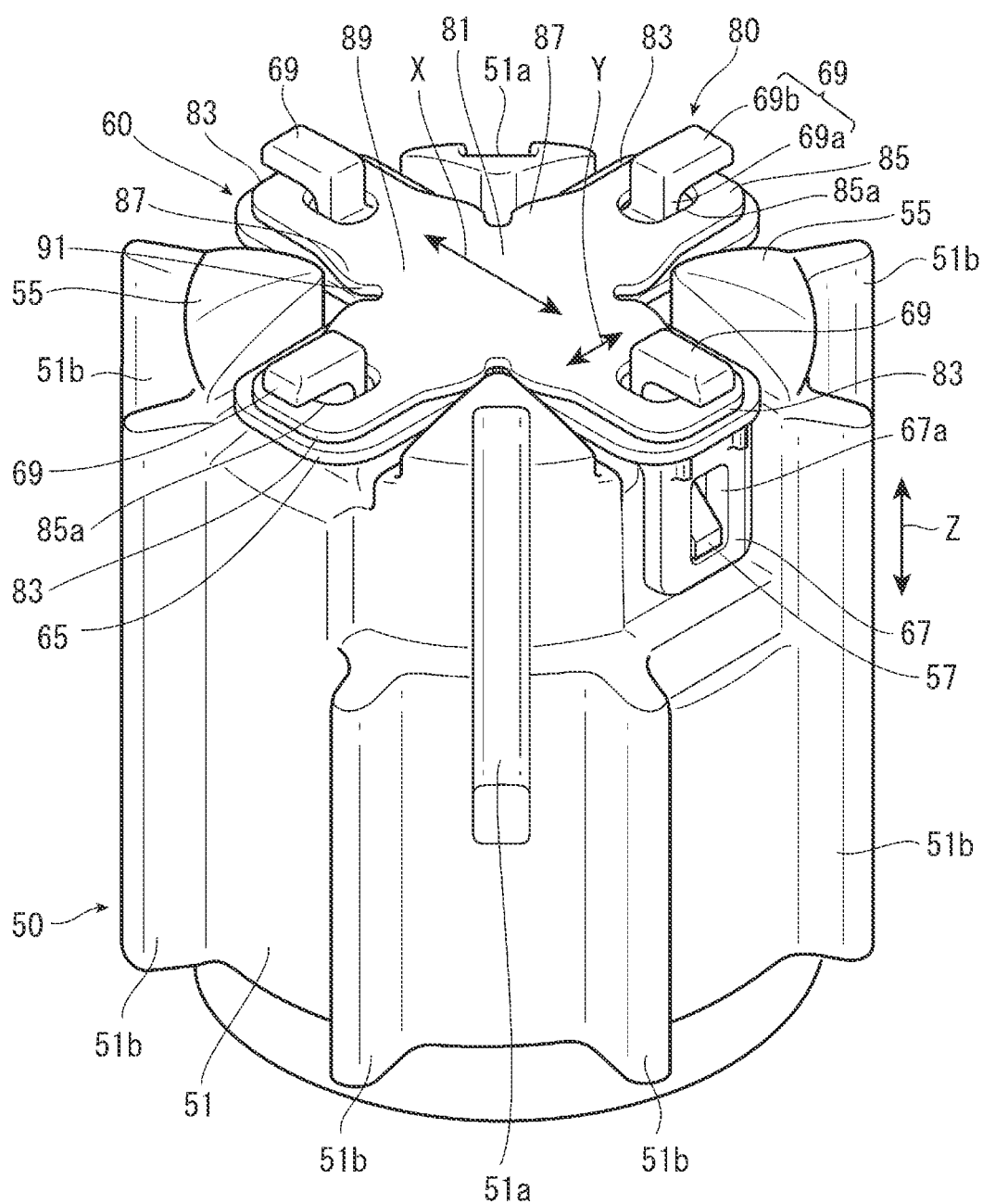
FIG. 4 is an enlarged perspective view of a float valve and a seal member constituting the valve device.

As shown in FIG. 4, by inserting the retaining protrusions 57 into the retaining holes 67a of the retaining pieces 67 from an inside, respectively, the seal support member 60 is retained and held swingably with respect to the float main body 50.

In a state where the retaining protrusion 57 is inserted into the retaining hole 67a, a predetermined gap is formed between both sides in a width direction of the retaining hole 67a and both sides in a width direction of the retaining protrusion 57, and a predetermined gap is also formed between both ends in an axial direction of the retaining hole 67a and both ends in an axial direction of the retaining protrusion 57.

Therefore, as indicated by reference signs X, Y, and Z shown in FIG. 4, with respect to the float main body 50, the seal support member 60 can move a predetermined distance along the width direction Y orthogonal to a radial direction X of the float valve 40, and can move a predetermined distance along the axial direction Z of the float valve 40, and further, the seal support member 60 can swing with respect to the float main body 50.

In addition, (1) when the seal support member 60 is moved to a maximum extent along the axial direction Z with respect to the float main body 50, the retaining protrusion 57 is locked to inner surface of one of both ends in a longitudinal direction of the retaining hole 67a, and (2) when the seal support member 60 is moved to a maximum extent along the width direction Y with respect to the float main body 50, the retaining protrusion 57 is locked to inner surface of one of both sides in the width direction of the retaining hole 67a, so that the seal support member 60 is retained and held with respect to the float main body 50.

A retaining hook 69, which is inserted into a support hole 85a (see FIGS. 6A and 6B) of the seal member 80, protrudes from a front side of the tip end portion of each of the extending portions 65 (a seal member 80 side).

The retaining hook 69 has a substantially inverted L shape, and includes a shaft portion 69a loosely fitted to the support hole 85a, and a protruding portion 69b protruding from an upper end of the shaft portion 69a beyond an inner peripheral edge of the support hole 85a. The shaft portion 69a is inserted into the support hole 85a of the seal member 80 so as to be movable along the radial direction X of the float valve 40 and movable along the width direction Y of the float valve 40.

A plurality of grooves 71 are formed in the placement surface 61a of the seal support member 60. In the embodiment, the plurality of (here, four) grooves 71 extending linearly from an outer peripheral edge portion between base end portions of the adjacent extending portions 65 and 65 toward a center of the central portion 63 are formed, and the grooves 71 communicate with each other via a circular recess 71a provided at the center of the central portion 63.

Next, the seal member 80 will be described with reference to FIGS. 1, 4, 6A and 6B, and the like.

The seal member 80 is disposed on an upper side of the seal support member 60, is retained and supported so as to be movable by a predetermined distance with respect to the seal support member 60, and is brought into contact with and separated from the valve seat 26 provided on the opening portion 25 to open and close the opening portion 25.

Figure 6A:
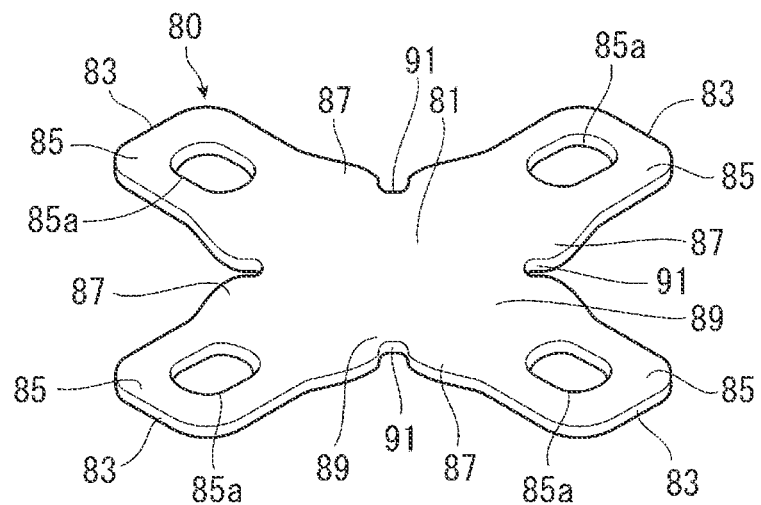
FIG. 6A is an enlarged perspective view of the seal member constituting the valve device.
Figure 6B:
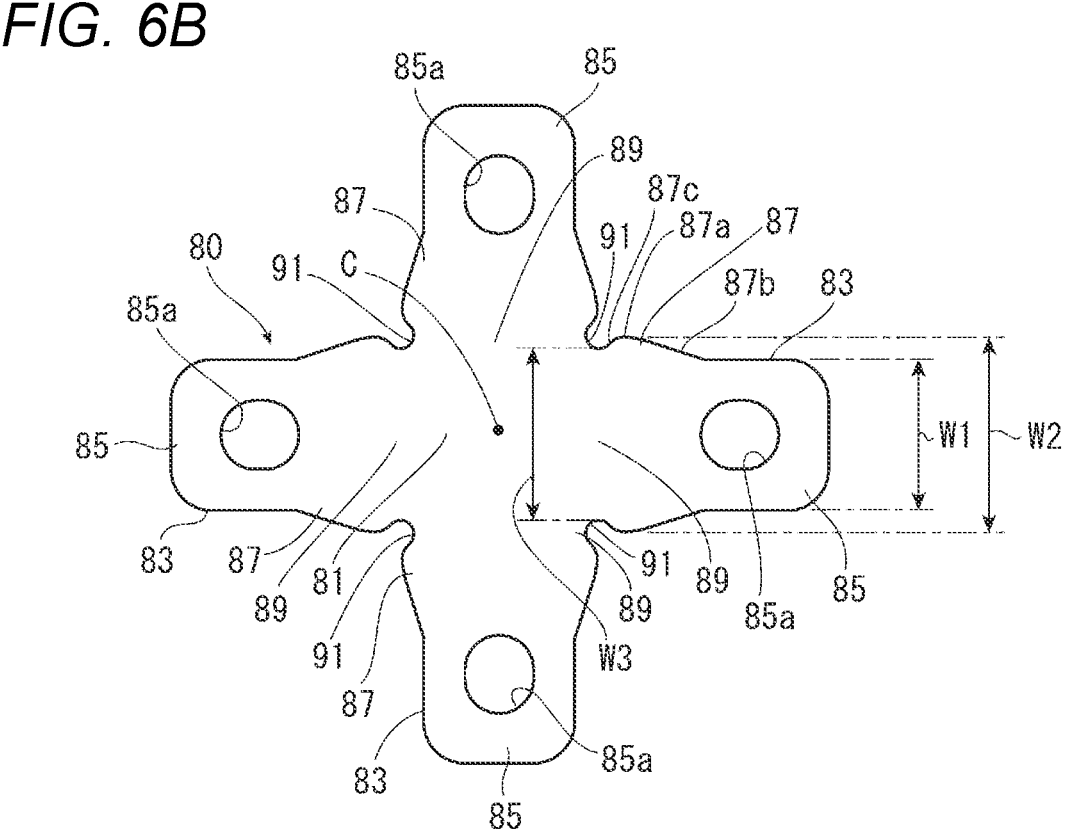
FIG. 6B is a plan view of the seal member.

As shown in FIGS. 6A and 6B, the seal member 80 includes a first cover portion 81 covering the first region 25a of the opening portion 25, and second cover portions 83 extending from the first cover portion 81 so as to cover the second regions 25b of the opening portion 25. That is, the seal member 80 includes the first cover portion 81, and a plurality of second cover portions 83 extending outward from an outer periphery of the first cover portion 81. More specifically, in the seal member 80 in the embodiment, four second cover portions 83 radially extend outward (extend in four directions) from the outer periphery of the first cover portion 81 corresponding to the opening portion 25 forming the substantially cross-shaped opening, and the second cover portions 83 and 83 adjacent to each other in a peripheral direction are orthogonal to each other, so that the seal member 80 has a substantially cross shape as a whole.

The second cover portion 83 includes a support portion 85 that is disposed on a tip end side in an extending direction of the second cover portion 83 and retains and supports the seal member 80 with respect to the float valve 40, a wide portion 87 that is disposed on a base end side in the extending direction of the second cover portion 83 with respect to the support portion 85 (it can be said that the wide portion 87 is disposed at a portion where a tip end of the second region 25b of the opening portion 25 is located), and a narrow portion 89 that is disposed on a base end side in the extending direction of the second cover portion 83 with respect to the wide portion 87 (it can be said that the narrow portion 89 is disposed at a position near the first region 25a of the opening portion 25 with respect to the wide portion 87) and is formed to be narrower than the wide portion 87, In the following description of each component of the second cover portion 83, the terms "tip end" and "tip end portion" mean the tip end and the tip end portion in the extending direction of the second cover portion 83, respectively, and the terms "base end" and "base end portion" mean the base end and the base end portion in the extending direction of the second cover portion 83, respectively.

Hereinafter, each portion of the second cover portion 83 will be described in more detail.

As shown in FIG. 6B, the tip end portion in the extending direction of the second cover portion 83 forms the support portion 85. The support portion 85 extends with a constant width W1, and a tip corner portion in an extending direction thereof is formed in an R shape. The width W1 of the support portion 85 is smaller than a width W2 of the wide portion 87 and a width W3 of the narrow portion 89. Further, the support hole 85a having a substantially elongated hole shape and extending long along the extending direction of the second cover portion 83 is formed in the support portion 85. The support hole 85a has a shape having rounded both ends in a longitudinal direction, and the shaft portion 69a of the retaining hook 69 provided on the seal support member 60 is loosely inserted therein. A base end portion in an extending direction of the support hole 85a (an end portion on a first cover portion 81 side) slightly overlaps with a region where the wide portion 87 is provided.

As shown in FIG. 4, the shaft portion 69a of the retaining hook 69 is inserted into the support hole 85a, and the protruding portion 69b is located on a peripheral edge of a front side of the support hole 85a, so that the seal member 80 is retained and supported so as to be movable by a predetermined distance with respect to the seal support member 60.

In a state where the shaft portion 69a is inserted into the support hole 85a, a predetermined gap is formed between both ends in an axial direction of the support hole 85a and the shaft portion 69a, and a predetermined gap is also formed between both sides in a width direction of the support hole 85a and the shaft portion 69a.

Therefore, as indicated by reference signs X, Y. and Z shown in FIG. 4, with respect to the seal support member 60, the seal member 80 can move a predetermined distance along the radial direction X of the float valve 40, can move a predetermined distance along the width direction Y of the float valve 40, and can further move a predetermined distance along the axial direction Z of the float valve 40.

In addition, (1) when the seal member 80 is moved to a maximum extent along the radial direction X with respect to the seal support member 60, the shaft portion 69a is locked to inner surface of one of both ends in the radial direction of the support hole 85a, (2) when the seal member 80 is moved to a maximum extent along the width direction Y with respect to the seal support member 60, the shaft portion 69a is locked to inner surface of one of both sides in the width direction of the support hole 85a, and (3) when the seal member 80 is moved to a maximum extent along the axial direction Z with respect to the seal support member 60, the protruding portion 69b is locked to the peripheral edge of the front side of the support hole 85a, so that the seal member 80 is retained and supported with respect to the seal support member 60.

On the other hand, as shown in FIGS. 6A and 6B, the wide portion 87 is continuously provided at a position near the base end portion of the second cover portion 83 with respect to the support portion 85. The wide portion 87 includes top portions 87a and 87a having a largest width in the second cover portion 83, first tapered portions 87b and 87b having a width gradually decreasing from the top portions 87a and 87a toward the tip end in the extending direction of the second cover portion 83, and second tapered portions 87c and 87c having a width gradually decreasing from the top portions 87a and 87a toward the base end in the extending direction of the second cover portion 83, and has a shape protruding with a predetermined width from both sides in a width direction of the second cover portion 83.

As shown in FIG. 7, the wide portion 87 is located at the tip end of the second region 25b of the opening portion 25 in a state where the vehicle is not overturned. In the embodiment, the wide portion 87 is provided such that the tip end of the second region 25h of the opening portion 25 is located between the top portions 87a and 87a of the wide portion 87. Further, the first tapered portion 87b is longer than the second tapered portion 87c in the extending direction of the second cover portion 83.

When a width of the wide portion 87, that is, a length between the top portions 87a and 87a of the wide portion 87 is defined as "W2", the width W2 of the wide portion 87 is formed to be larger than the width W1 of the support portion 85 and the width W3 of the narrow portion 89.

Further, in a state where the seal member 80 is retained and supported by the support portion 85 with respect to the float valve 40, a width of the wide portion 87 is set such that the tip end in an extending direction of the second region 25b of the opening portion 25 is covered, and the second region 25b of the opening portion 25 is not exposed out of the seal member 80 even in a state where the seal member 80 is maximally displaced in a radial direction and/or a peripheral direction of the housing 15 with respect to the opening portion 25.

Figure 10:
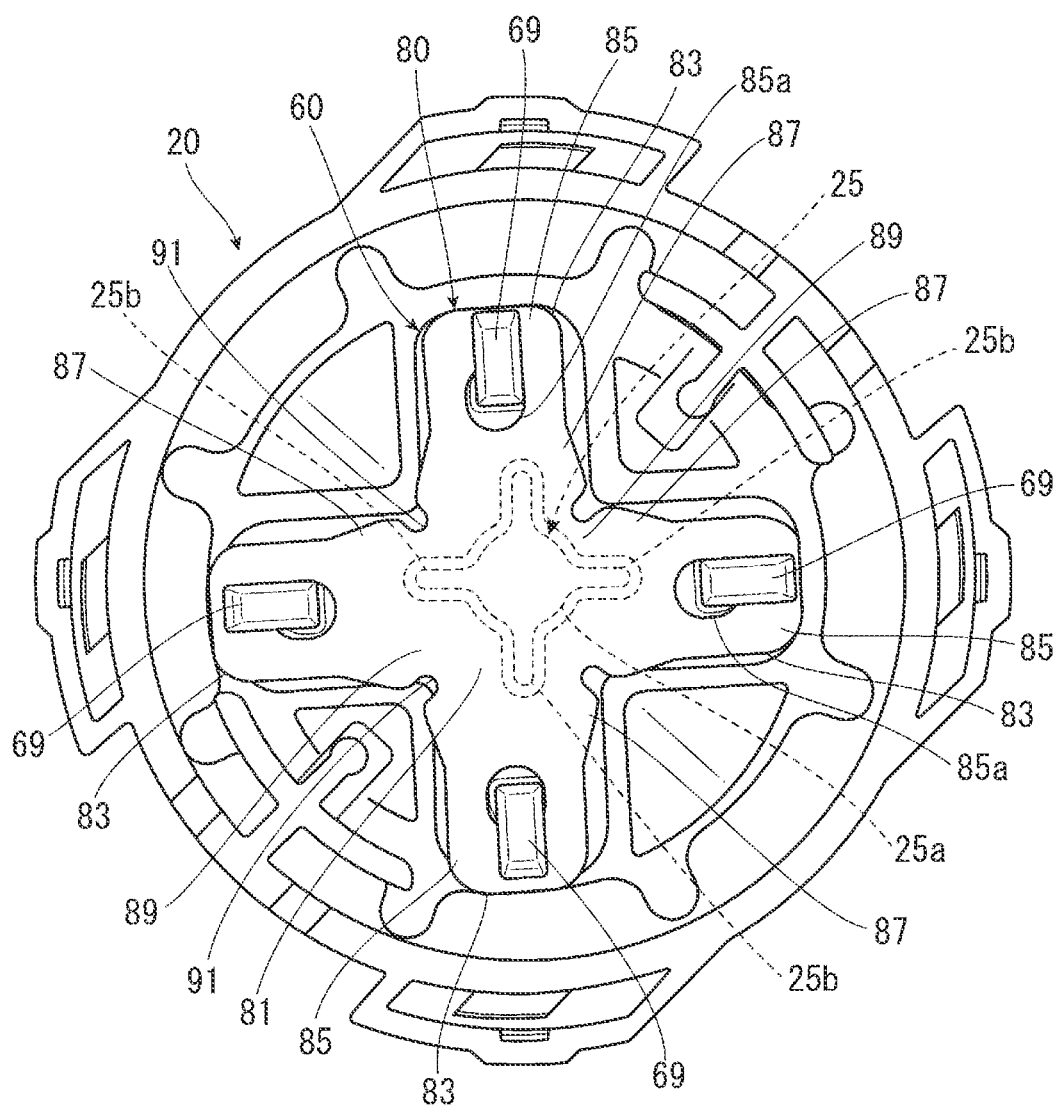
FIG. 10 is a plan view showing a state where the seal member is displaced in a radial direction and a peripheral direction of the housing from a state shown in FIG. 7.

FIG. 10 shows a state where the vehicle is overturned by 90°, a valve axial direction of the float valve 40 (a direction along an axial center of the float valve 40) is lateral, and the seal member 80 is maximally displaced in a radial direction and/or a peripheral direction of the housing main body 20 with respect to the opening portion 25, and even in this state, the width W2 of the wide portion 87 is set such that the tip end of the second region 25b of the opening portion 25 is covered, and the second region 25b of the opening portion 25 is not exposed out of the seal member 80. In this state, the tip ends of some of the second regions 25b, among a plurality of second regions 25b constituting the opening portion 25, are located in the wide portions 87, respectively, and the tip ends of the other second regions 25b are located in the narrow portions 89 instead of the wide portions 87, respectively (see FIG. 10).

The narrow portion 89 is provided via cutouts 91 and 91 formed on both sides of the base end portion of the second cover portion 83. More specifically, the cutout 91 is formed toward a center C of the first cover portion 81, between the base end portions of the second cover portions 83 and 83 extending from the outer periphery of the first cover portion 81 and adjacent to each other in the peripheral direction, and the narrow portion 89 is provided via the cutout 91.

In a case of the embodiment, the cutout 91 having a constant width and a rounded tip end is formed obliquely inward toward the center C of the first cover portion 81, between the base end portions of the second cover portions 83 and 83 adjacent to each other in the peripheral direction (a boundary portion between portions where the base end portions of the adjacent second cover portions 83 and 83 are connected to each other) among the second cover portions 83 extending in four directions from the outer periphery of the first cover portion 81. The narrow portion 89 having the width W3 smaller than the width W2 of the wide portion 87 and larger than the width W1 of the support portion 85 is formed at the base end portion in the extending direction of the second cover portion 83 via a pair of cutouts 91 and 91 formed adjacent to each other in the peripheral direction of the first cover portion 81.

The narrow portion 89 is disposed on a base end portion side of the second cover portion 83 and at a boundary portion with the first cover portion 81, and has a constricted shape. That is, the narrow portion 89 is disposed on the base end portion side in the extending direction of the second cover portion 83 with respect to the wide portion 87 and at the boundary portion with the first cover portion 81, and the pair of cutouts 91 and 91 are each formed from the boundary portion of the portion where the base end portions of the adjacent second cover portions 83 and 83 are connected to each other, and as a result, the narrow portion 89 has the constricted shape in the width direction of the second cover portion 83.

As shown in FIG. 7, when the float valve 40 and the seal member 80 are viewed from the valve axial direction, the groove 71 of the seal support member 60 is visible from the cutout 91 of the seal member 80.

In the seal member 80 described above, all components such as the first cover portion, the second cover portion, the support portion, the wide portion, and the narrow portion are integrally formed of, for example, an elastic material such as rubber or elastic elastomer.

Modifications

Shapes and structures of the housing, the housing main body, the lower cap, and the upper cover which constitute the housing, the seal member, the first and second regions of the opening portion, the first and second cover portions constituting the seal member, the support portion, the wide portion, and the narrow portion which constitute the second cover portion, and the like, which constitute the present invention, are not limited to the above embodiment.

The housing 15 in the above embodiment includes the housing main body 20, the lower cap 30, and the upper cover 35, but a housing may have a structure including at least a partition wall and an opening portion.

Further, the opening portion 25 in the embodiment is the substantially cross-shaped opening having the diameter enlarged in the central portion, but an opening portion may have a first region, and a second region extending in a slit shape from the first region and forming an end portion of the opening portion.

Figure 12A:
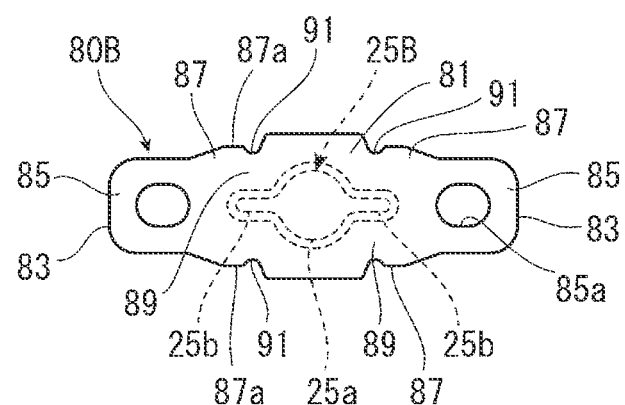
FIG. 12A is a plan view showing a second modification of the seal member.

For example, as shown in FIG. 12A, the opening portion may be an opening portion having the first region 25a having a substantially circular hole shape in a central portion, and a pair of second regions 25b and 25b extending in a slit shape from two positions facing each other in a radial direction on an outer periphery of the first region 25a (the second regions 25b having the slit shape extend in two directions from the first region 25a). The pair of second regions 25b and 25b extend on the same straight line.

Figure 12B:
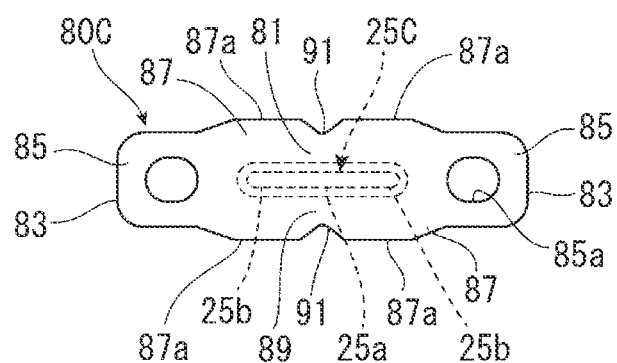
FIG. 12B is a plan view showing a third modification of the seal member.

As shown in FIG. 12B, the opening portion may be an opening portion 25C having a slit shape extending linearly as a whole. In this case, a central portion in an extending direction of the opening portion 25C is the first region 25a, and both side portions in the extending direction extending from both sides of the first region 25a are a pair of second regions 25b and 25b. The first region 25a and the second region 25b have the same width.

Further, an opening portion may include a first region, and a second region extending in a slit shape from the first region in one direction, three directions, or five or more directions and having a width smaller than or equal to that of the first region.

The peripheral wall 21 of the housing main body 20, the peripheral wall 33 of the lower cap 30, and the peripheral wall 36 of the upper cover 35 in the embodiment each have a substantially cylindrical shape, but these peripheral walls may have, for example, an elliptic cylindrical shape, a square cylindrical shape, or the like.

Further, in the embodiment, one float valve 40 is accommodated in one valve chamber V formed in the housing 15. Alternatively, for example, a plurality of float valves may be accommodated in one valve chamber (functioning as a fuel cut valve, a pressure adjusting valve, or the like in addition to a filling-up restriction valve), a plurality of valve chambers may be defined in the housing, and the float valves may be accommodated in the respective valve chambers.

Figure 11:
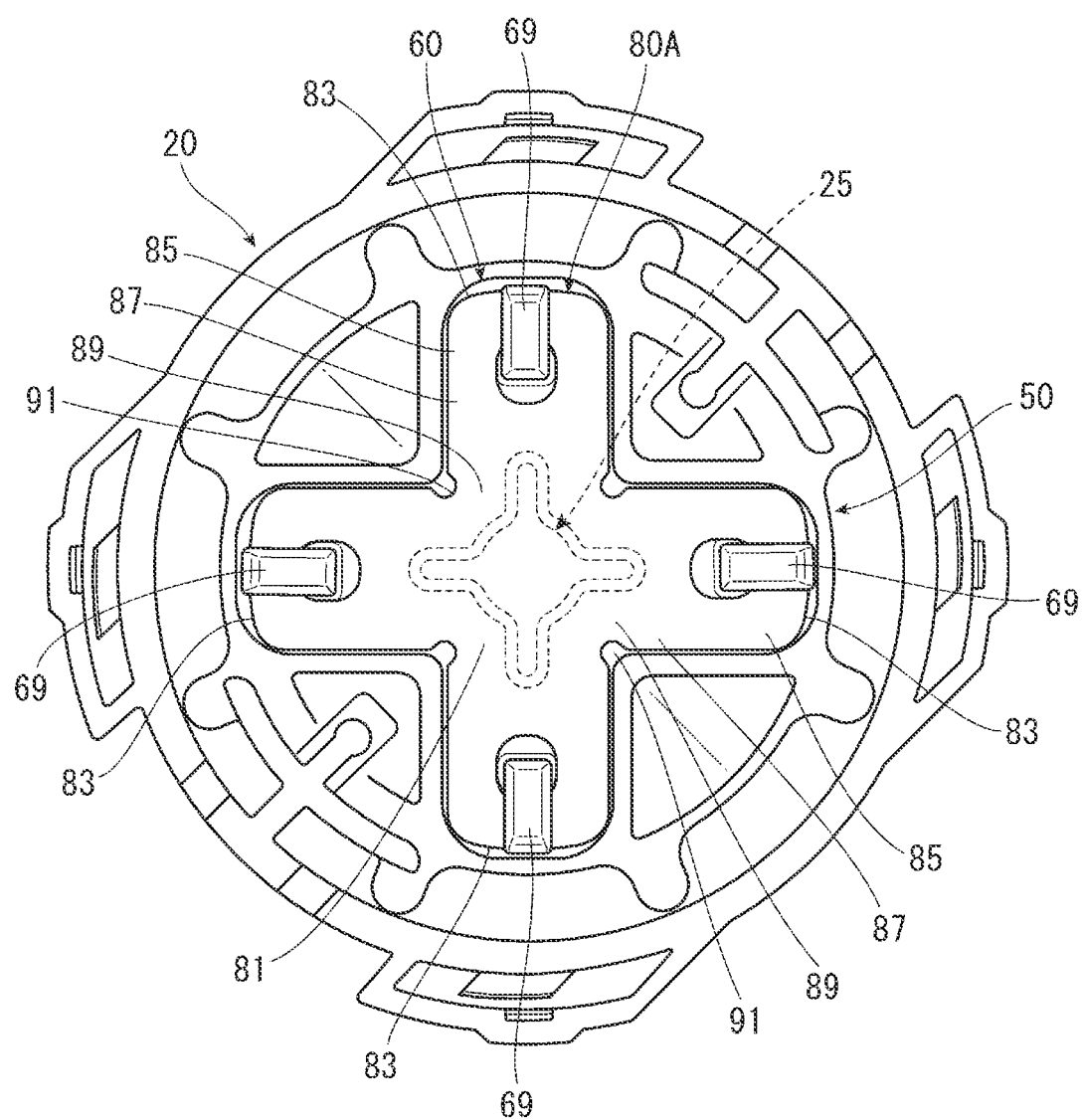
FIG. 11 is a plan view showing a first modification of the seal member.

The seal member 80 in the embodiment has a shape shown in FIGS. 6A, 6B and 7, but may have, for example, shapes shown in FIGS. 11, 12A and 12B.

Similar to the seal member 80 shown in FIGS. 6A and 6B, a seal member 80A shown in FIG. 11 includes four second cover portions 83 and has a substantially cross shape as a whole, but the support portion 85 provided on a tip end portion side in the extending direction of the second cover portion 83 and the wide portion 87 provided near the base end portion with respect to the support portion 85 are formed with the same width. The wide portion 87 is provided such that a base end portion thereof is located at the tip end of the second region 25b of the opening portion 25.

A seal member S0B shown in FIG. 12A includes a pair of second cover portions 83 and 83 extending on the same straight line from two positions facing each other in a radial direction on an outer periphery of the first cover portion 81 so as to correspond to the opening portion 25B, and has a substantially long plate shape as a whole (the second cover portions 83 extend in two directions from the first cover portion 81), In a case of the seal member 80B, the wide portion 87 is provided such that the tip end of the second region 25b of the opening portion 25 is located between the top portions 87a and 87a of the wide portion 87. Two pairs of cutouts 91 and 91 forming the narrow portion 89 are formed at both sides in a width direction orthogonal to an extending direction of the seal member 80B extending in the substantially long plate shape and at a predetermined interval in the extending direction of the seal member 80B.

Further, a seal member 80C shown in FIG. 12B has a shape extending in a substantially long plate shape as a whole corresponding to the opening portion 25C. A pair of cutouts 91 and 91 having a substantially triangular groove shape are formed on both sides in a width direction at a central portion in an extending direction of the seal member 80C, one narrow portion 89 is provided at the center in the extending direction of the seal member 80C via the cutouts 91 and 9L and the narrow portion 89 also serves as the first cover portion 81. Further, the top portions 87a and 87a of the wide portion 87 extend longer than those of the wide portions 87 of the seal member 80 shown in FIGS. 6A, 6B and 7, the seal member 80A shown in FIG. 11, and the seal member 80B shown in FIG. 12A.

A seal member may include a first cover portion, and a second cover portion extending from the first cover portion in one direction, three directions, or five or more directions.

Further, the wide portion 87 in the embodiment includes the top portions 87a and 87a, the first tapered portions 87b and 87b, and the second tapered portions 87c and 87c shorter than the first tapered portions 87b and 87b, but for example, a wide portion may have a curved shape, an arc shape, a substantially triangular shape, or a substantially trapezoidal shape protruding from both sides in a width direction of a second cover portion. The wide portion may have a shape in Which a second tapered portion is longer than a first tapered portion, or a shape in which a first tapered portion and a second tapered portion extend by the same length.

The narrow portion 89 in the embodiment is provided via the cutouts 91, but a narrow portion may be provided without using a cutout, and may be disposed near a first region with respect to a wide portion and narrower than the wide portion.

Operation and Effect

Next, operation and effect of the valve device 10 having the above configurations will be described.

As shown in FIG. 3, in a state where a fuel liquid level in the fuel tank does not rise and the float valve 40 is not immersed in the fuel, the float valve 40 is lowered in the valve chamber V, the seal member 80 separates from the valve seat 26, the opening portion 25 is opened, and the valve chamber V and the ventilation chamber R communicate with each other via the opening portion 25. In this state, when the fuel vapor in the fuel tank increases and a tank internal pressure increases due to the traveling of the vehicle or the like, the fuel vapor flows into the valve chamber V from the through hole 31b of the lower cap 30 and the through hole 21a of the housing main body 20, passes through the opening portion 25, flows into the ventilation chamber R, and is sent to the canister (not shown) via the fuel vapor pipe 38, thereby suppressing an increase in the pressure in the fuel tank.

When the vehicle turns in a curve, travels on a road, a slope, or the like having unevenness, or is overturned due to an accident, the fuel in the fuel tank oscillates vigorously, the fuel liquid level rises, and the float valve 40 is immersed in the fuel, the float valve 40 is raised due to buoyancy of the float valve 40 itself and the urging force of the urging spring S. As a result, as shown in FIG. 8, the first cover portion 81 and the second cover portion 83 of the seal member 80 are brought into contact with the valve seat 26 to close the first region 25a and the second region 25b of the opening portion 25, and thus it is possible to suppress the fuel from flowing into the ventilation chamber R through the opening portion 25.

Figure 8:
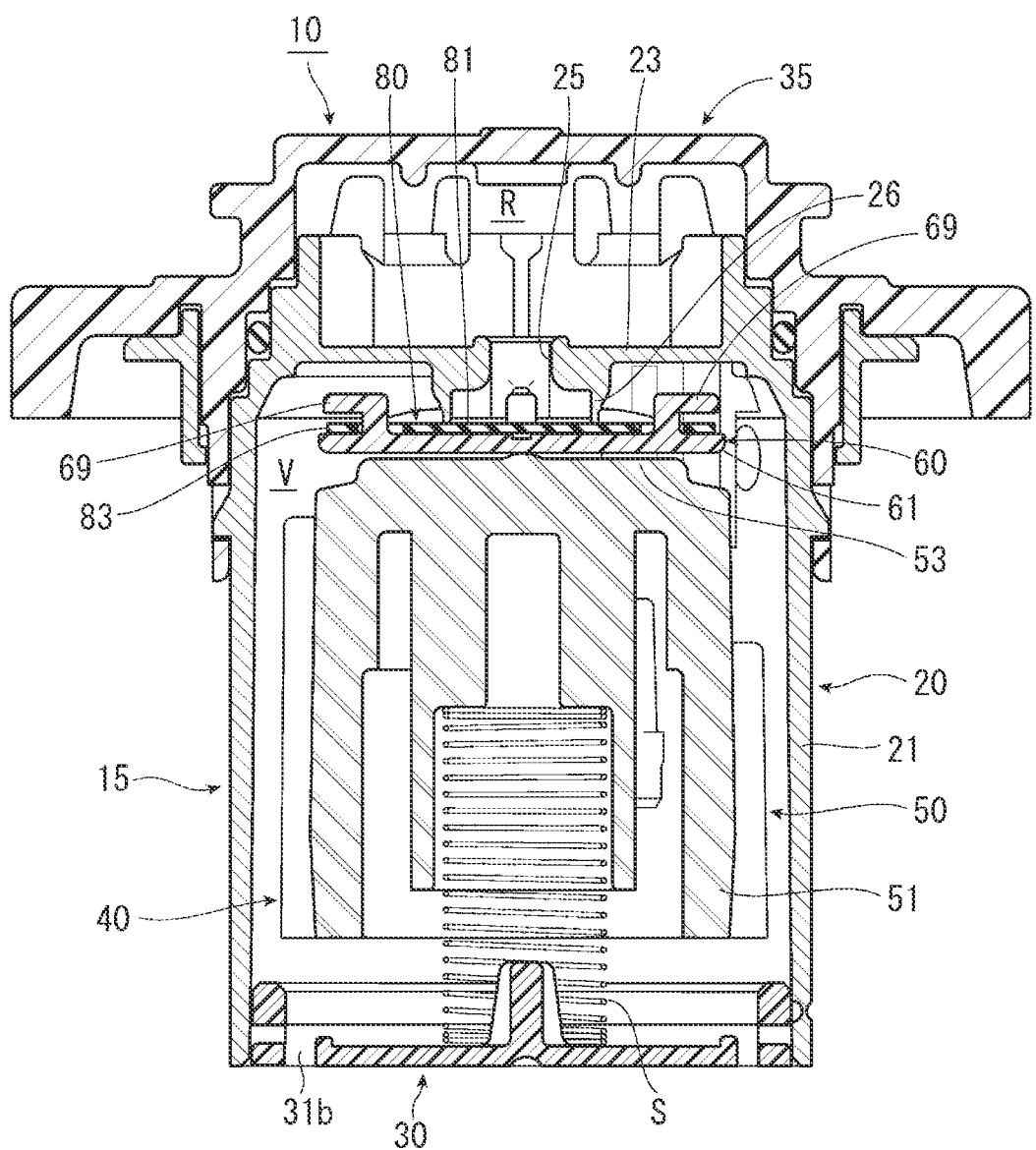
FIG. 8 is a cross-sectional view of the valve device in a state where the float valve is raised without being tilted and an opening portion is closed.

FIG. 8 shows a case where the float valve 40 is raised straight without being tilted with respect to an axial direction of the housing 15, and the float valve 40 may be raised while being tilted with respect to the axial direction of the housing 15. In this case, the seal support member 60 can swing with respect to the float main body 50, and thus when the float valve 40 is raised in a tilted manner, and the seal member 80 is brought into contact with the valve seat 26 in a tilted state, the seal support member 60 swings as appropriate with respect to the float main body 50, and the tilt of the seal member 80 is corrected. Therefore, the seal member 80 can be brought into contact with the valve seat 26 without a tilt, and the opening portion 25 can be firmly closed.

Figure 9:
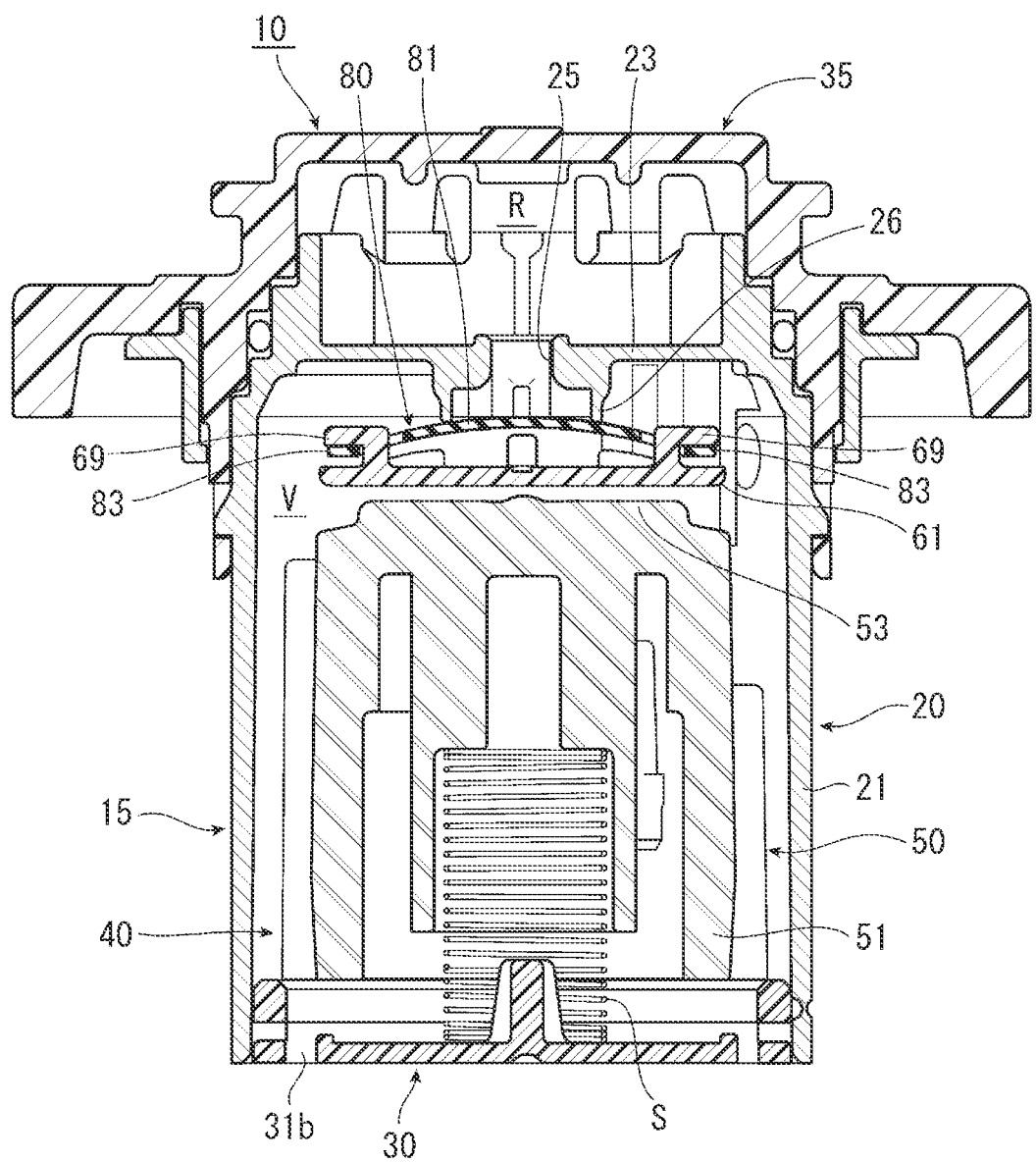
FIG. 9 is a cross-sectional view of the valve device in a state where the float valve is about to be lowered from a state where the float valve closes the opening portion.

In the above state, when the oscillation or the like of the fuel is stopped, and there is no buoyancy from the fuel applied to the float valve 40, or when the pressure in the fuel tank is lowered, the float valve 40 is lowered due to its own weight. Thus, as shown in FIG. 9, the seal support member 60 is lowered by a predetermined distance with respect to the seal member 80 which is in contact with and attached to the valve seat 26, and the retaining protrusion 57 of the float main body 50 is locked to an inner surface of a lower end of the retaining hole 67a of the seal support member 60.

As a result, a load of the float main body 50 is applied to the seal support member the shaft portion 69a of the retaining hook 69 of the seal support member 60 is lowered in the support hole 85a of the seal member 80, and the protruding portion 69h of the retaining hook 69 is locked to the peripheral edge of the front side of the support hole 85a. Accordingly, loads of the float main body 50 and the seal support member 60 are applied to the second cover portion 83 of the seal member 80 via the seal support member 60.

Thus, the second cover portion 83 of the seal member 80 is elastically deformed so as to be pulled obliquely downward, and the second cover portion 83 moves along the axial direction Z and the radial direction X of the float valve 40. As a result, as shown in FIG. 9, the second cover portion 83 is gradually separated from a base end portion of the wide portion 87 and a narrow portion 89 side with respect to the valve seat 26 to open the second region of the opening portion 25, and then the first cover portion 81 is peeled off from the valve seat 26, and thus the first region 25a of the opening portion 25 can be opened to completely open the entire opening portion 25. As a result, it is possible to increase a valve re-opening pressure of the float valve 40. The expression "to increase a valve re-opening pressure" means a performance in which a float valve can be easily peeled off from a valve seat provided on an opening portion and the opening portion can be opened even in a state where a tank internal pressure is high. As the seal member 80 is peeled off from the valve seat 26, the entire float valve 40 is lowered.

The vehicle such as the automobile may be overturned by 90° due to the accident or the like. In this case, as the vehicle is overturned, the fuel tank and the valve device are also overturned and are lateral (the valve axial direction of the float valve 40 is horizontal or nearly horizontal), and thus as shown in FIG. 10, the seal member 80 is displaced in the peripheral direction and the radial direction of the housing 15 with respect to the opening portion 25.

However, even in such a situation, the valve device 10 can reliably close the opening portion 25.

That is, in the valve device 10, in the state where the seal member 80 is retained and supported by the support portion 85 with respect to the float valve 40, as shown in FIG. 10, the width of the wide portion 87 is set such that the tip end in the extending direction of the second region 25b of the opening portion 25 is covered, and the second region 25b of the opening portion 25 is not exposed out of the seal member 80 even in the state where the seal member 80 is maximally displaced in the radial direction and/or the peripheral direction of the housing 15 with respect to the opening portion 25.

Therefore, even when the vehicle is overturned and the seal member 80 is displaced in the radial direction and the peripheral direction of the housing 15 with respect to the opening portion 25 as described above, the first region 25a and the second region 25b of the opening portion 25 can be firmly covered by the seal member 80, and thus the opening portion 25 can be reliably closed by the seal member 80 while improving a sealing property of the seal member 80 with respect to the valve seat 26. As a result, it is possible to suppress the fuel from flowing into the ventilation chamber R when the vehicle is overturned.

The seal member 80 can be easily deflected and deformed by the narrow portion 89 provided on the second cover portion 83, and thus the seal member 80 in contact with the valve seat 26 of the opening portion 25 can be easily peeled off from the opening portion 25. That is, in a state shown in FIG. 9, the second cover portion 83 is easily deflected and deformed when being pulled, and the base end portion of the wide portion 87 and the narrow portion 89 of the second cover portion 83, and further the first cover portion 81 are easily peeled off from the valve seat 26. As a result, it is possible to increase the valve re-opening pressure of the float valve 40.

Further, in the embodiment, as shown in FIG. 7, the first region 25a of the opening portion 25 is formed to be larger than the second region 25b of the opening portion 25, and the narrow portion 89 of the second cover portion 83 of the seal member 80 is provided via the cutouts 91 and 91 formed on both sides of the base end portion of the second cover portion 83.

According to the above aspect, the narrow portion 89 has the above shape, and thus it is possible to easily form the seal member 80 into a shape that is easily deflected and deformed while ensuring the sealing property of the seal member 80 with respect to the opening portion 25.

In the embodiment, as shown in FIGS. 6A, 6B and 7, the support portion 85 of the seal member 80 is formed to be narrower than the wide portion 87.

According to this aspect, the support portion 85 of the seal member 80 can be easily deflected and deformed, and an area of the support portion 85 is reduced, so that gas such as air or fuel vapor is less likely to come into contact with the support portion 85, and as a result, the seal member 80 and the float valve 40 as a whole can be made less likely to blow up. Further, in the embodiment, the second cover portions 83 of the seal member 80 extend from the outer periphery of the first cover portion 81 in at least three directions (here, four directions), and the cutouts 91 are formed toward the center C of the first cover portion 81.

According to the above aspect, the second cover portions 83 extend from the outer periphery of the first cover portion 81 in at least three directions, and the cutouts 91 are formed toward the center C of the first cover portion 81, and thus the second cover portions 83 can be easily deflected and deformed uniformly.

The present invention is not limited to the embodiment described above, and various modifications can be made without departing from the gist of the present invention, and such embodiments are also included in the scope of the present invention.

What is claimed is:

1. A valve device, comprising:
   a housing in which a valve chamber configured to communicate with an inside of a fuel tank on a lower side and a ventilation chamber configured to communicate with an outside of the fuel tank on an upper side are provided via a partition wall, and an opening portion through which the valve chamber and the ventilation chamber are to communicate with each other is formed in the partition wall;
   a float valve slidably accommodated in the valve chamber; and
   a seal member disposed on an upper side of the float valve and configured to close the opening portion, wherein
   the opening portion includes
      a first region, and
      a second region extending in a slit shape from the first region and forming an end portion of the opening portion,
   the seal member includes
      a first cover portion covering the first region, and
      a second cover portion extending from the first cover portion so as to cover the second region,
   the second cover portion includes
      a support portion disposed on a tip end side in an extending direction of the second cover portion and configured to retain and support the seal member with respect to the float valve,
      a wide portion disposed on a base end side in the extending direction with respect to the support portion, and
      a narrow portion provided on a base end side in the extending direction with respect to the wide portion and formed to be narrower than the wide portion, and
   in a state where the seal member is retained and supported by the support portion with respect to the float valve, a width of the wide portion is set such that a tip end of the second region is covered, and that the second region of the opening portion is not exposed out of the seal member even in a state where the seal member is maximally displaced in a radial direction and/or a peripheral direction of the housing with respect to the opening portion.

2. The valve device according to claim 1, wherein
   the first region is formed to be larger than the second region, and
   the narrow portion is provided via cutouts formed on both sides of a base end portion of the second cover portion.

3. The valve device according to claim 1, wherein
   the support portion is formed to be narrower than the wide portion.

4. The valve device according to claim 1, wherein
   the second cover portion extends in at least three directions from an outer periphery of the first cover portion, and cutouts are formed toward a center of the first cover portion.

* * * * *